May 7, 1940. R. E. WOOLLEY 2,199,769
MEASURING APPARATUS
Filed May 1, 1936 2 Sheets-Sheet 1
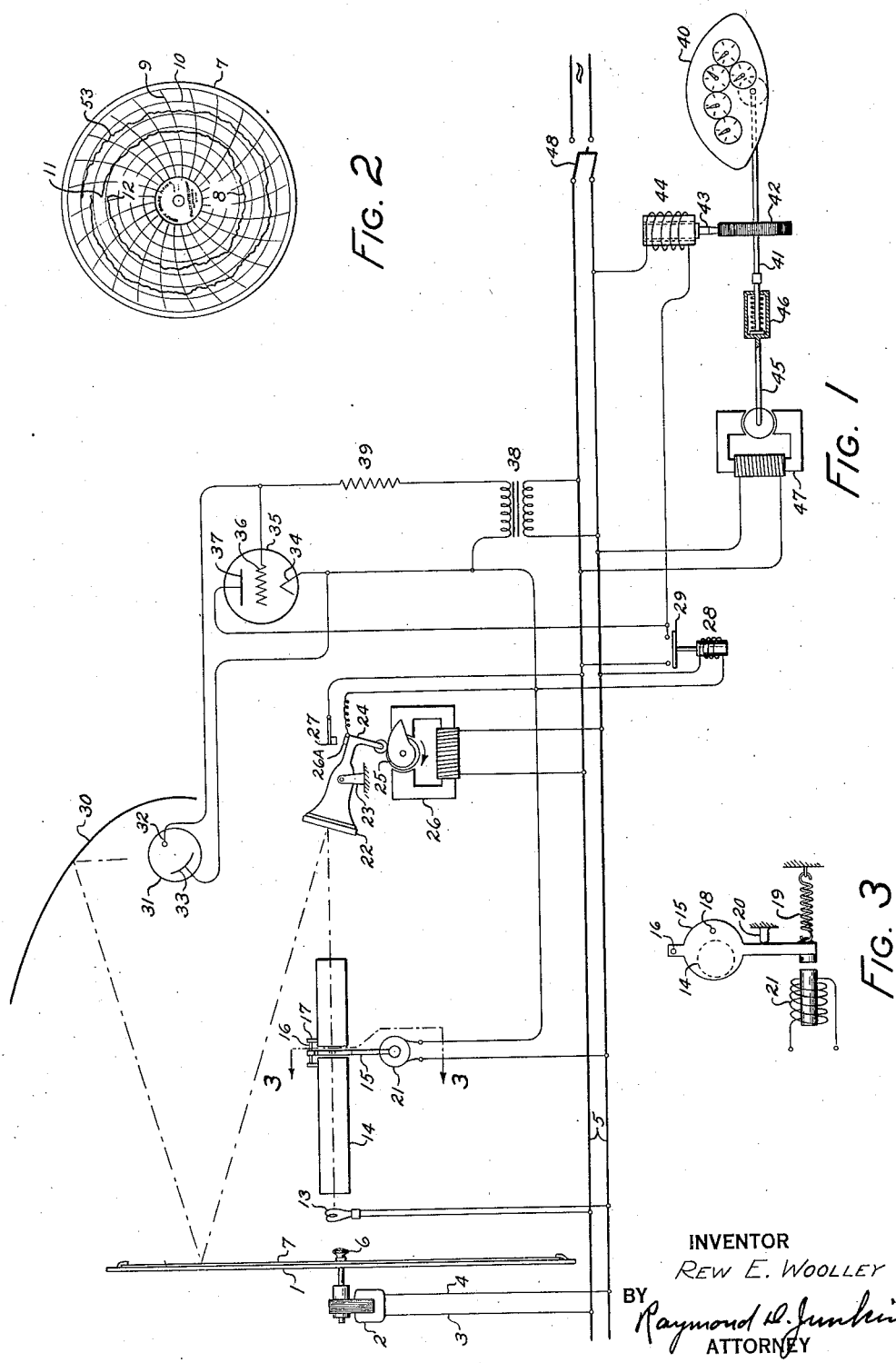
INVENTOR
REW E. WOOLLEY
BY Raymond D. Junkins
ATTORNEY May 7, 1940.    R. E. WOOLLEY    2,199,769
MEASURING APPARATUS
Filed May 1, 1936    2 Sheets-Sheet 2
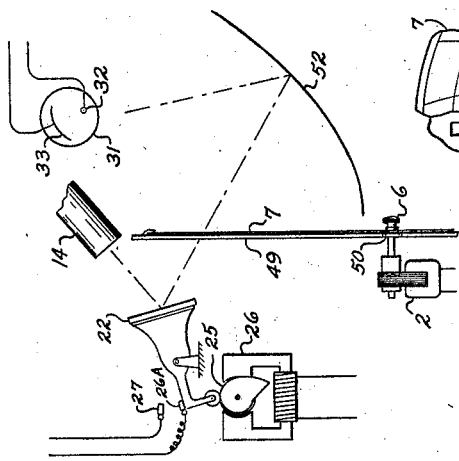
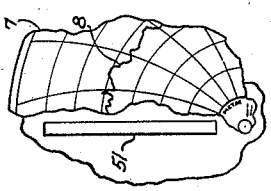
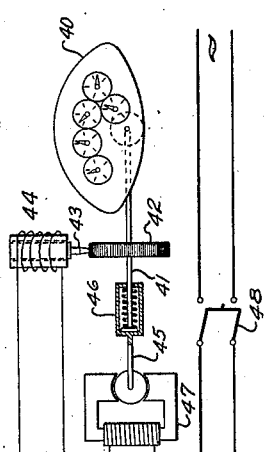
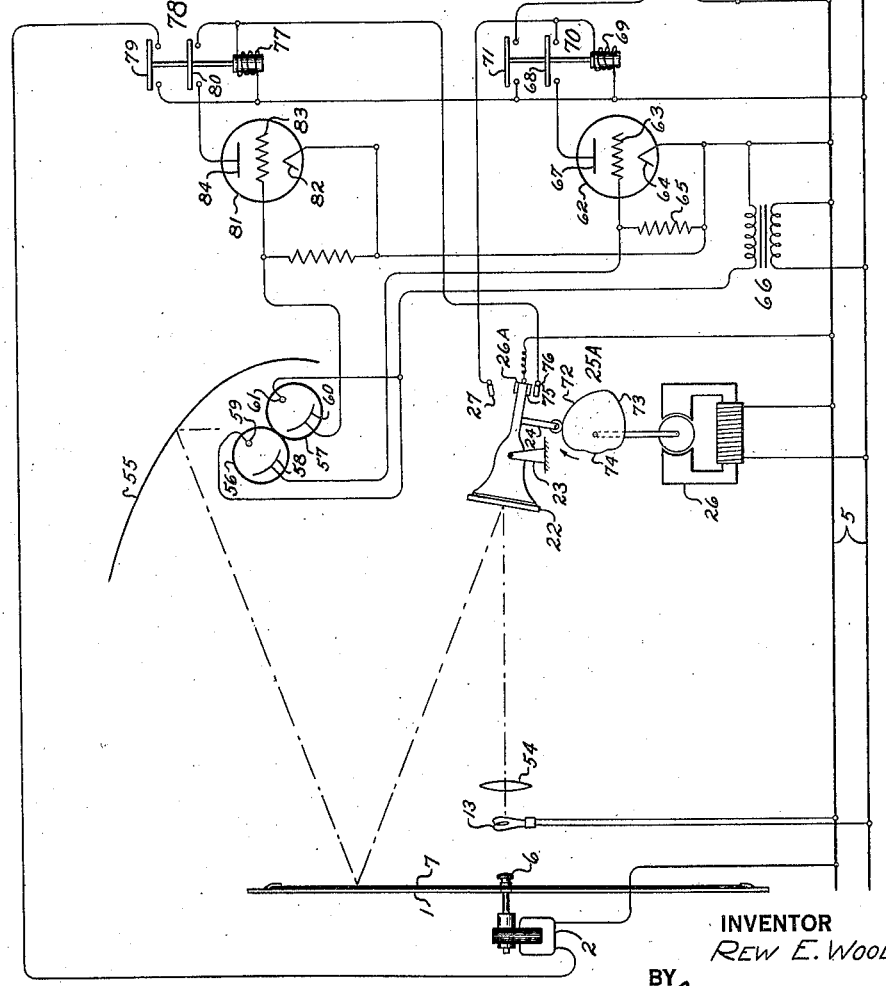
INVENTOR
REW E. WOOLLEY
BY
Raymond D. Junkins
ATTORNEY Patented May 7, 1940

2,199,769

UNITED STATES PATENT OFFICE 2,199,769

MEASURING APPARATUS

Rew E. Woolley, Shaker Heights, Ohio, assignor to Bailey Meter Company, a corporation of Delaware Application May 1, 1936, Serial No. 77,363

19 Claims. (Cl. 235—61)

This invention relates to apparatus for the integration of variables, especially for the integration of variables with respect to time where such variables may be of a physical, chemical, electrical, hydraulic or other nature.

One object of my invention is to provide an integrator for determining the total quantity of a variable over a period of time from a rate record of the variable. Specifically, for example, my invention contemplates determining the total flow of a fluid through a conduit over a past period of time from a chart having inscribed thereon a record of the rate of flow of the fluid over the said period of time.

A further object of my invention is to provide means for compensating the readings of an integrator for errors due to changes in a condition of the variable affecting the rate measurement. Thus, for example, rate of flow meters are usually calibrated to read in terms of weight, as for example pounds per hour at predetermined density conditions of temperature and pressure. Such meters may be of a type wherein a differential pressure bearing a known relation to the rate of flow is produced by the flow through a constriction, such as an orifice, flow nozzle or a Venturi tube in the conduit. The actual weight of the fluid flowing through the restriction is not only a function of the difference in pressure at opposite sides of the restriction, but for any given value of pressure differential varies with the density of the fluid. Accordingly, variations in conditions such as pressure and temperature affect the accuracy of the record and must be compensated for if the correct total in desired units is to be obtained from the integrator.

Further objects will become apparent from the drawings and description to follow, as well as from the appended claims which are not limited by the specific embodiments illustrated and described.

In the drawings:

Fig. 1 represents diagrammatically a specific embodiment of my invention.

Fig. 2 illustrates a typical chart having a plurality of records inscribed thereon.

Fig. 3 is an elevation view along the line 3—3 of Fig. 1.

Fig. 4 illustrates an alternate form of apparatus which may be used in the embodiment of my invention shown in Fig. 1.

Fig. 5 is a fragmentary view of a part of the apparatus illustrated in Fig. 4.

Fig. 6 illustrates a further embodiment of my invention.

Referring to Fig. 1, I therein show a circular chart plate 1 rotatable by a self-starting synchronous motor 2 connected by conductors 3 and 4 to a suitable alternating current source 5. Clamped to the plate 1 by a nut 6 is a circular record chart 7 having inscribed thereon a rate record of a variable which it is desired to integrate with respect to time.

The chart 7 which should be taken as merely illustrative of a typical chart having a rate record inscribed thereon is shown in Fig. 2. Inscribed on the chart is a record 8 which may, by way of example, be a record over a period of time of the rate of flow of fluid through a conduit such as produced by a flow meter illustrated in Patent 1,123,164 to E. G. Bailey dated December 29, 1914. The record 8 in this example is produced by a stylus moved radially with respect to the chart center in accordance with the rate of flow of fluid. Accordingly, the radial distance of the record from the zero or no flow position of the stylus is an indication of the rate of flow in units, such as pounds per hour, cubic feet per minute, etc.

Charts such as indicated at 7 are usually fabricated of paper and the record of the stylus is made in ink. The paper of which the chart 7 is fabricated may be selected for certain desirable qualities. In one embodiment of my invention I prefer to use a paper having a light reflecting surface, so that a beam of light striking the chart is reflected therefrom. In other embodiments I prefer to use a semi-transparent paper so that a light beam striking one side is transmitted therethrough and is emitted from the opposite side, or I may prefer to use charts fabricated from a paper of a particular color to influence the light reflecting qualities of the paper. When using a chart of light reflecting paper I usually do not employ an ink having light reflecting qualities but one which absorbs substantially all of the light rays within a particular band of the visible spectrum, or I may employ an ink dispersing the light rays so that they are not reflected in a well defined beam. When employing a transparent paper I usually prefer to use an opaque ink, so that no light rays pass through the record.

In producing the rate record the chart 7 is rotated by a time responsive device and arranged to complete one revolution in a desired unit of time, such as an hour, day, or week. In order that the rate of flow existing at any previous instant may readily be determined, the chart is provided with arcuate radial graduations such as indicated at 9, dividing the chart into desired time units; and concentric circular graduations such as indicated at 10, corresponding to the position of the stylus at predetermined rates of flow. The latter graduations may be uniform when, for example, the stylus moves in direct proportion to changes in the magnitude of the variable, or they may be non-uniform to properly compensate for any functional relation existing between changes in the magnitude of the variable and motion of the stylus. In the former, radial distances from the initial circular graduation will be directed proportional to rate, whereas in the latter they may be proportional to the square, square root, or other function of rate.

In the assumed example, in order to obtain the total flow of fluid through the conduit over a period of time represented by the rate curve 8, it is necessary to integrate the curve with respect to time from its origin at 11 to its termination at 12. This is usually accomplished by means of manually operated planimeters, as well known in the art. The manual work involved, particularly when a large number of charts are to be planimetered, is laborious, tedious and costly. Through the use of my invention, as will hereinafter be evidenced, charts such as indicated at 7 may be automatically planimetered, thereby eliminating the human element in the operation entirely and greatly facilitating the operation.

Referring again to Fig. 1, there is connected to the source 5 a light source 13 located adjacent an open end of a hollow light transmitting tube 14. Dividing the tube 14 is a shutter 15 oscillatable about a spindle 16 secured to supports 17. As shown in Fig. 3 the shutter 15 is provided with an eccentrically located light orifice 18. Normally the shutter 15 is held by a spring 19 against a stop 20 so that the light orifice is without the tube 14 and light does not pass therethrough. Upon energization of a solenoid 21, however, the shutter 15 is moved in a clockwise direction until the orifice 18 is in line with the interior of the tube 14 and a beam of light can pass therethrough.

Suitably aligned with the opposite end of the tube 14 is a mirror 22 oscillatable about a pivotal support 23 and arranged to direct the beam of light established by the orifice 18 against the chart 7. A rearwardly extending arm 24 forms a follower for a cam 25 continuously rotated by a self-starting synchronous motor 26 connected to the source 5. The cam 25 may have a uniform rise section whereby the light beam reflected from the mirror 22 will periodically traverse, or scan, the chart 7 at a uniform rate outwardly; and a quick return section so that upon reaching the maximum graduation the light beam will immediately be returned to the initial or zero graduation and the cycle repeated. The contour of the cam 25 may be varied as desired to give any desired variable rate of motion to the light beam for reasons hereinafter explained.

Carried by the arm 24 is a contact 26A arranged to engage a contact 27 when the position of the mirror 22 is such that the beam of light strikes the zero or initial graduation on the chart 7. Engagement of the contact 26A with the contact 27 serves to momentarily energize a solenoid 28 having a normally open finger 29; and the solenoid 21 to bring the orifice 18 into line with the tube 14.

In this embodiment of my invention I prefer to use charts fabricated of a light reflecting paper and an ink absorbing or dispersing the light rays so that the beam of light directed by the mirror 22 against the chart 7 will be normally reflected against a suitably shaped mirror 30 onto a photoelectric cell 31 having an anode 32 and a cathode 33. The mirror 30 may be so shaped and the position of the photoelectric cell relative thereto may be such that regardless of the point on the chart 7 which the light beam strikes it will be reflected upon the photoelectric cell 31.

The cathode 33 of the photoelectric cell 31 is connected to the cathode 34 of an electron discharge device 35 having a grid 36 and an anode 37. The anode 32 is connected to the grid 36, so that upon the photoelectric cell 31 being rendered conducting by the light beam reflected from the chart 7, a potential is impressed upon the grid substantially equal to that of the cathode 34, whereby the device 35 is rendered conducting. Normally the grid 36 is connected to the cathode 34 through the secondary of a transformer 38 and a resistance 39. The primary of the transformer 38 is so connected to the source 5 that during the half cycle when the anode 37 is positive with respect to the cathode 34 the grid 36 is negative with respect to the cathode 34 and the device 35 is non-conducting. During the half cycle when the grid 36 is positive with respect to the cathode 34, the anode 37 is negative and the device 35 is non-conducting.

The anode 37 is connected to one side of the source 5 through the finger 29 of the solenoid 28. The cathode 34 is connected to the opposite side of the source 5 through the solenoids 21 and 28 arranged in parallel. Accordingly notwithstanding that the electron discharge device 35 may be rendered conducting by means of the photoelectric cell 31, the solenoids 21 and 28 will not be energized unless the finger 29 is in closed position. If, however, the finger 29 is closed at the time the electron discharge device 35 is rendered conducting, solenoids 21 and 28 will remain energized maintaining the light orifice 18 within the tube 14 and sustaining the finger 29 in closed position until the circuit is broken due to the electron discharge device 35 being again rendered non-conducting.

At 40 I show a register actuated through a driven shaft 41 to which is secured an escape wheel 42. Normally in engagement with the latter is a dog 43 adapted to be disengaged therefrom upon energization of a solenoid 44 connected to the source 5 through the finger 29. The driven shaft 41 is connected to a driving shaft 45 through a friction clutch 46. A self-starting synchronous motor 47 energized from the source 5 is mechanically connected to drive the shaft 45. As shown, the motor 47 may contain integral reducing gears (not shown) so that the shaft 45 will rotate at any desired speed. The arrangement is such that upon energization of the solenoid 44 by closure of the finger 29, the dog 43 is disengaged from the escape wheel 42, permitting the register 40 to be driven at a uniform rate by the motor 47. Upon engagement of the dog 43 with the escape wheel 42 the driven shaft 41 is locked in position, the friction clutch 46 slipping to permit normal operation of the motor 47 and driving shaft 45.

In operation, the source 5 is deenergized through opening of a suitable switch 48. A chart 7 to be integrated is placed on the chart plate 1 so that the origin 11 of the record 8 will intercept the light beam reflected from the mirror 22. The cam 25 is manually rotated until the mirror 22 will reflect the beam of light against the initial or zero graduation of the chart 7 and the reading of the register 40 is noted. Upon closure of the switch 48 the solenoid 28 is momentarily energized through contacts 26A and 27, closing finger 29 and energizing solenoid 44, permitting the register 40 to be driven by the motor 47. Similarly the solenoid 21 is energized, thereby causing the light beam to be directed against the mirror 22, chart 7, mirror 30, to photo cell 31. Energization of photo cell 31 renders the electron discharge device 35 conducting, thereby sustaining energization of the solenoids 21 and 28 after the contact 26A disengages the contact 27. Accordingly, the solenoid 44 will continue to be energized and the register 40 to operate. Such operation of the register will continue until the light beam intersects the point on the record 8 in its path, when the light beam will be absorbed or so dispersed that it will not be reflected to the mirror 30, thereby rendering the photoelectric device 31 non-conducting, deenergizing the solenoid 21 so that the shutter 15 is positioned to prevent passage of light through the orifice 18. Simultaneously solenoid 28 will be deenergized, opening finger 29, thereby deenergizing solenoid 44. The dog 43 will then engage the escape wheel 42 and the register 40 will be stopped. Upon the light beam passing the record 8 the photo cell 31 will remain non-conducting, as the shutter 15 remains positioned so that the light orifice 18 is without the tube 14. Thereafter the cycle of operation is repeated, contacts 26A and 27 engaging upon each return of the mirror 22 to the zero position, momentarily energizing solenoids 21 and 28, which energization is sustained until the light beam intersects a point on the record 8, when they are deenergized and remain so until the mirror 22 is again returned to the zero position.

Concurrently with the cyclic operation of the mirror 22, the chart 7 is rotated at any desired angular velocity by the motor 2. Accordingly, the record 8 is progressively advanced past the light beam from its origin 11 to its termination at 12. At each reciprocation the light beam will therefore intercept a successive point on curve 8 located an incremental distance from the preceding intercepted point. Upon the end point 12 of curve 8 being brought into the path of the light beam the switch 48 is opened, deenergizing the source 5 and rendering the entire device inoperative.

During each cycle of operation the reading of the register 40 has advanced an amount proportional to the radial distance of the point on curve 8 intersected by the light beam from the zero or initial chart graduation, and as the cycles are completed in constant increments of time the advance in register reading will be proportional to the integral of the curve 8 between successive points intersected by the light beam. Accordingly, the total advance in reading of the register 40 produced in scanning the curve 8 from its origin 11 to its end point 12 will be proportional to the integral of the entire curve. If, for example, the curve 8 is a record of the rate of flow through a pipe, then the total advance in the reading of the register 40 will be proportional to the total flow through the pipe during the period of time represented by the curve 8.

If a non-linear functional relation between radial stylus motion and instantaneous magnitude of the variable exists, that is if equal changes in the magnitude of the variable do not produce equal changes in stylus position, then proper compensation may be made therefor by proper shaping of the cam 25. For example, assuming that the motion of the stylus varies as the square of the instantaneous magnitude of the variable, the cam 25 may be so shaped that the velocity of the light beam outwardly on the chart will progressively increase in direct proportion to the square of the distance from the zero graduation. The register 40 during each cycle of operation will then advance an amount proportional to the square root of the distance, or an amount directly proportional to the indicated magnitude of the variable.

In Fig. 4 I show a modified arrangement wherein the mirror 22 is located on the opposite side of the chart 7 than the photo cell 31. In this modification a stationary chart plate 49 is used, and the chart 7 is clamped by nut 6 against an arbor 50 rotated by the motor 2. The chart plate 49 is provided with a slot 51 as shown in Fig. 5, aligned with the mirror 22 so that the light beam strikes the reverse side of the chart 7.

With this arrangement I prefer to use a chart fabricated of a semi-transparent paper so that the light beam is transmitted through the chart 7 against a reflector 52 to the photo cell 31. The ink, or other marking fluid, used is preferably opaque so that the light beam on striking the record 8 is momentarily interrupted, thereby rendering the photoelectric device 31 non-conducting. It is apparent that the modification illustrated in Fig. 4 will function the same as that shown in Fig. 1. The contact 26A engaging the contact 27 when the light beam is coincident with the zero graduation on chart 7, thereby starting actuation of the register 40 which continues until the light beam is momentarily interrupted through intersecting a point on curve 8, thereby rendering photo cell 31 non-conducting and stopping actuation of the register 40 for the remainder of the cycle.

In Fig. 6 I show a form of my invention arranged to compensate the readings of the register 40 for variations in a condition of the variable which affects the accuracy of the rate record. In principle the apparatus shown acts to vary the average angular velocity of the chart plate 1 in accordance with changes in the magnitude of a condition, so that a greater or lesser number of cycles of operation of the mirror 22 are required to scan a given length of the rate curve 8 and the advance of the register 40 accordingly modified over that resulting if the chart plate 1 had been rotated at a constant rate of speed. More specifically the apparatus acts to vary the average angular velocity of the chart plate 1 in accordance with changes in a second record inscribed on the chart 7.

In Fig. 2 I show such a second record 53 inscribed on the chart 7 which may be, taking the record 8 as the rate of flow of a vapor such as steam, a record of coexisting pressures, or if the record 8 be one of the rate of flow of a non-compressible fluid, such as water, then the record 53 would preferably be one of the coexisting temperatures of the water at the point of measurement. As known, the relation between flow and differential produced by an orifice or other restriction in a conduit may be expressed by the formula:

$$W = K\sqrt{\frac{h}{V}}$$

where
- W = rate of flow in desired units
- K = a constant
- h = differential pressure across restriction
- V = specific volume It is apparent that a change in any condition such as pressure or temperature affecting the specific volume of the fluid will affect the differential head produced for a given rate of flow, and the rate record must be corrected or proper compensation made for changes in pressure and temperature from predetermined values if the true rate of flow is to be obtained therefrom. I have chosen to discuss this specific example of the effect of changes in pressure and temperature on rate of flow meters as an example only, and it is not to be considered restrictive for basically, as hereinbefore stated, the apparatus to be described acts to correct the integral of one record in accordance with changes in another record regardless of what relation exists between such records.

In Fig. 6 a lens 54 is disposed between the light source 13 and mirror 22 to establish a beam of light to be reflected by the latter against the chart 7. In this embodiment I preferably use a black or transparent chart so that substantially no light is reflected therefrom. The record 8 may be made in a red ink for example, and the record 53 in an ink of a color such as blue near the opposite end of the visible spectrum. The beam of light from the mirror 22 will normally not be reflected from the chart 7, but upon crossing the record 8 a red beam will momentarily be reflected and upon crossing the record 53 a blue beam will momentarily be reflected.

A suitably shaped mirror 55 is arranged to reflect the beam of light onto a photo cell 56 and a photo cell 57. The photo cell 56 having a cathode 58 and an anode 59 is non-conducting except when exposed to the particular color, in the example chosen red, reflected by the record 8 whereas the photo cell 57 having a cathode 60 and an anode 61 is non-conducting except when exposed to the particular color, in the example chosen blue, reflected by the record 53.

Momentary energization of the photo cell 56 renders a normally conducting electron discharge device 62 non-conducting by imposing upon the grid 63 a potential negative with respect to the cathode 64. For, as shown, the grid 63 is normally connected to the cathode 64 through a resistance 65, whereas energization of the photo cell 56 serves to short circuit the resistance 65 and connect the grid 63 to the secondary of a transformer 66 having a primary so connected to the source 5 that during the half cycle when the anode 67 of the device 62 is positive with respect to the cathode 64 the grid 63 is negative with respect thereto.

The cathode 64 is connected to one side of the source 5 and the anode 67 to the opposite side through a normally open finger 68 and solenoid 69 of a relay 70, having a second normally open finger 71 controlling the energization of the solenoid 44 from the source 5. It is apparent that notwithstanding that the device 62 is conducting, energization of the solenoid 69 will not result unless the finger 68 is in closed position at the time the device is rendered conducting.

The mirror 22 is arranged to be oscillated between predetermined limits by a cam 25A, having uniform rise sections 72, 73 and a substantially circular section 74. When the cam follower 24 engages the highest point of the cam 25A the mirror 22 is positioned so that the beam of light strikes the zero graduation of the chart 7 and the contacts 26A and 27 engage, thereby momentarily energizing the solenoid 69. Thereafter until the beam of light intersects the record 8 the solenoid 69 will remain energized through the agency of the electron discharge device 62. Energization of the photo cell 56, due to the light beam striking the record 8 will act to momentarily render the electron discharge device 62 non-conducting, thereby deenergizing the solenoid 69. During the increment of time when the solenoid 69 is energized, the finger 71 will be closed, energizing solenoid 44 and permitting actuation of the register 40. During each outward passage of the light beam from the zero graduation of the chart 7 the register 40 will be actuated for an increment of time proportional to the distance of the point on the record 8 intersected by the light beam, from the zero chart graduation.

During the outward passages of the light beam, motor 2 driving the chart 7 does not rotate as in the embodiment shown in Fig. 1, but remains stationary. During the inward passages of the light beam however, the motor 2 rotates for an increment of time determined by the circular section 74 of the cam 25A and for an additional increment of time determined by the radial distance of the point on the record 53 intercepted by the light beam from the maximum graduation of the chart 7.

When the light beam strikes the maximum chart graduation a contact 75 carried by the follower 24 engages with a contact 76 connected to a solenoid 77 of a relay 78. The relay 78 is provided with normally open fingers 79 and 80 which are closed upon energization of the solenoid 77 through closure of contacts 75 and 76. Closure of the finger 79 energizes the motor 2 to effect rotation of the chart 7 in desired direction. Closure of the finger 80 sustains energization of the solenoid 77 through a normally conducting electron discharge device 81, having a cathode 82, a grid 83, and an anode 84. Accordingly, the solenoid 77 will not be deenergized upon the contact 75 disengaging the contact 76, but will remain energized until the light beam intersects the record 53, thereby rendering the photoelectric cell 57 conducting and deenergizing the electron discharge device 81.

The circular section 74 is of such length that the chart 7 will be advanced a correct amount if the record 53 is at the maximum value of the recorded range. The rise section 73 is shaped to properly modify the incremental chart advance to correct for the distance the point on the record 53 intersected by the light beam is from the maximum value of the recorded range. The rise 73 herein shown as uniform may be modified as necessary to produce the chart advance necessary to compensate for variations in the condition represented by the record 53. Thus taking the previous example where the record 8 exhibited rate of flow and the record 53 pressure; as the pressure decreases indicated by the record 53 moving toward the chart center, the incremental advance in chart position should increase, as a decrease in pressure indicates an increase in specific volume. As a functional relation exists between pressure and the square root of the specific volume the rise section 73 will necessarily have a characteristic shape so that the reading of the register 30 will represent the correct total flow.

The invention may be embodied in other specific forms without departing from the spirit or essential characteristics thereof. The present embodiment therefore should be considered in all respects as illustrative and not restrictive, the scope of the invention being indicated by the appended claims rather than by the foregoing description.

What I claim as new, and desire to secure by Letters Patent of the United States, is:

1. In combination with a chart having a record of the instantaneous successive magnitudes of a variable traced thereon, means for producing a light beam, means for periodically oscillating said light beam along a definite path, said chart disposed in the path of said beam, means for moving said chart to present succeeding points of said record to said beam, a register, and means including means sensitive to said beam after striking said chart for controlling the actuation of said register.

2. In combination, means for producing a beam of light, a rotary light reflecting chart having a curve inscribed thereon in a non-light reflecting substance, means for rotating said chart, an oscillatable reflector for periodically causing said beam of light to traverse said chart, a photo cell rendered conducting by said beam of light as reflected from said chart, and rendered non-conducting when the beam of light intersects the non-light reflecting curve, means under the control of said photo cell for extinguishing said beam of light upon being rendered non-conducting, means for reestablishing said beam at a predetermined position of said reflector, a register, means for driving said register at a constant rate of speed during the increments of time when said photo cell is rendered conducting and means inhibiting operation of said register during the increments of time when said photo cell is rendered non-conducting.

3. In a machine for integrating charts, a movable plate for receiving a chart having a plurality of curves thereon, means for successively determining the distance of selected points on one of said curves from a reference point during alternate periods of time, and means for moving said movable plate amounts proportional to the distance of selected successive points on another of said curves during periods of time succeeding said alternate periods of time.

4. In a machine for integrating charts, a chart having a plurality of curves thereon, a register, means under the control of one of said curves for actuating said register, and means under the control of another of said curves for moving said chart.

5. In a machine for integrating charts, a chart having a plurality of curves thereon, means for periodically during alternate periods of time determining the distance between a selected point on one of said curves and a reference point, a register under the control of said first named means, and means for bringing successive selected points into cooperative relationship with said first named means comprising means for moving said chart during periods of time succeeding said alternate periods an amount proportional to the distance between a reference point and selected points on another of said curves.

6. In a machine for integrating charts having a record thereon, a light beam periodically oscillated between limits, a photo cell opposed to said beam, means for successively bringing selected points of said record into the path of said light beam for varying the illumination of said cell, and a device under the control of the energy output of said cell.

7. In a machine for integrating charts, in combination, a light beam periodically oscillated between limits, a photo cell opposed to said light beam, a chart having a plurality of records thereon disposed in the path of said light beam, one of said records adapted to vary the illumination of said photo cell by said light beam, a registering device, means for controlling the actuation of said registering device including means for starting actuation of said device at a predetermined point in the travel of said light beam, and means for stopping actuation of said device sensitive to a change in energy output of said photoelectric cell, and means for bringing selected points on said one of said records into the path of said light beam comprising a second photo cell disposed in the path of said beam of light, the other of the records adapted to vary the illumination of said second cell, a motor for moving said chart, and means for controlling the energization of said motor including means for energizing said motor at a predetermined point in the travel of said light beam, and means for deenergizing said motor under the control of the second photoelectric cell.

8. A machine for integrating a chart having a curve of a variable inscribed thereon comprising means including light sensitive means for periodically establishing electric impulses proportional in time length to the position on said chart of selected points in said curve, constant speed motor means, and means actuated thereby for the duration of said impulses.

9. A machine for integrating a chart having a curve of a variable inscribed thereon comprising, means for periodically establishing a light beam for an increment of time corresponding to the position on said chart of selected points in said curve including a photoelectric cell sensitive to said light beam, an electric circuit including said photoelectric cell for establishing electric impulses corresponding in time duration to the duration of said beam, a register, and means sensitive to said impulses for controlling the actuation of said register.

10. In a telemetric system for remotely producing an actuation proportional to the magnitude of a variable, a transmitter, a receiver, and a circuit connecting said transmitter with said receiver, said transmitter comprising photoelectric means connected in said circuit, motor means continuously operable at substantially constant speed, and radiant energy means cyclically operated by said motor means for periodically rendering said photoelectric means conductive for increments of time proportional to the magnitude of the variable; and said receiver comprising substantially constant speed motor means and means actuated thereby for the increments of time when said photoelectric means is rendered conducting.

11. In a telemetric system for remotely producing an actuation proportional to the magnitude of a variable, in combination, a transmitter, a receiver and a circuit connecting said receiver with said transmitter, said transmitter comprising substantially constant speed motor means, means including means actuated by said motor means for periodically establishing a light beam for increments of time proportional to the magnitude of the variable, means connected in said circuit and sensitive to said light beam for establishing electric impulses corresponding to the time duration of said light beam; and said receiver comprising substantially constant speed motor means and means actuated thereby for the duration of said impulses.

12. In an integrator, in combination, a source of light, a light controlled current passing means, means including a chart having a record of the successive instantaneous magnitudes of a variable traced thereon for controlling the effectiveness of the light from said source on said light controlled current passing means in accordance with the position of said record on said chart, a register, and means sensitive to the current passed by said light controlled means for controlling the actuation of said register.

13. In combination with a chart having a graphic record of the magnitude of a variable traced thereon, means for moving said chart at a constant velocity, means for producing a beam of light, means for periodically causing said beam of light to traverse said chart, an electric circuit, means including a photo cell sensitive to the beam of light after striking said chart for controlling the current in said circuit, a register, means for starting actuation of said register when said beam of light strikes a predetermined point on said chart, and means sensitive to the current in said circuit for stopping actuation of said register when said light beam encounters said graphic record.

14. A machine for integrating charts comprising, a rotary plate adapted to receive a chart having a curve thereon, a light beam periodically oscillated at substantially constant speed over said chart, an electric circuit, a photo cell sensitive to said beam of light after striking said chart for controlling the current in said circuit, said curve interrupting projection of said beam of light to said cell upon interception therewith, a register, and means sensitive to the current in said circuit for stopping actuation of said register when said light beam encounters said graphic record.

15. In a machine for integrating a chart having a record inscribed thereon, means for periodically establishing a beam of light for increments of time proportional to the distance of a selected point on said record from a predetermined point on said chart, an electric circuit, a photo cell sensitive to said beam of light for controlling the current in said circuit, a register, and means sensitive to the current in said circuit for controlling the actuation of said register.

16. Apparatus for integrating a variable with respect to time comprising, a chart having a record of the variable traced thereon with respect to time, means for periodically determining the distance between a selected point on one of said curves and a reference point, a register, means under the control of said first named means for actuating said register an amount corresponding to said distance, means for compensating the integration of said variable for changes in a condition comprising means for bringing successive selected points into cooperative relationship with said first named means, and means for controlling the distance between the points selected on said record in accordance with the magnitude of said condition.

17. A machine for obtaining the integral of the product of two quantities represented by curves comprising a chart having two curves thereon, scanning means, means for moving said chart past said scanning means, a register, means under the control of said scanning means for varying the rate of operation of said register in accordance with the undulations in said one of said curves, and means for controlling said first named means to vary the speed with which said chart passes said scanning means in accordance with the undulations in the second of said curves.

18. In a telemetric transmitter for cyclically transmitting electric impulses of a time duration corresponding to the magnitude of a variable, in combination, an electric circuit, photoelectric means connected in said circuit, motor means continuously operated at substantially constant speed, and means including radiant energy means cyclically operated by said motor means for periodically rendering said photoelectric means conductive for increments of time proportional to the magnitude of the variable.

19. In a telemetric transmitter for cyclically transmitting electric impulses of a time duration corresponding to the magnitude of a variable, in combination, means for establishing a light beam, means for periodically oscillating said light beam between definite limits, an electric circuit, photoelectric means sensitive to said beam of light connected in said circuit, and means including means for intercepting said light beam at a point in each oscillation determined by the magnitude of the variable for rendering said photoelectric means conducting during each oscillation for an increment of time corresponding to the magnitude of the variable.

REW E. WOOLLEY.